United States Patent
Feser et al.

(10) Patent No.: US 6,711,485 B2
(45) Date of Patent: Mar. 23, 2004

(54) METHOD AND DEVICE FOR CONTROLLING THE TRIGGERING OF A MOTOR VEHICLE OCCUPANT PROTECTION SYSTEM

(75) Inventors: Michael Feser, Barbing (DE); Oskar Leirich, Mintraching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/946,977

(22) Filed: Sep. 4, 2001

(65) Prior Publication Data

US 2003/0097212 A1 May 22, 2003

Related U.S. Application Data

(63) Continuation of application No. PCT/DE00/00606, filed on Mar. 1, 2000.

(30) Foreign Application Priority Data

Mar. 4, 1999 (DE) .......................... 199 09 538

(51) Int. Cl.[7] .............................................. B60R 21/32
(52) U.S. Cl. .................. 701/45; 180/273; 180/274; 180/282; 280/734; 280/736; 340/436; 340/667; 340/669; 706/52; 706/900; 700/50
(58) Field of Search .............. 701/45, 36, 46; 280/735, 734, 731, 739, 736; 180/282, 274, 273, 272, 289, 268; 340/436, 438, 667, 669; 706/52, 900, 905, 8; 700/50

(56) References Cited

U.S. PATENT DOCUMENTS

| 5,229,943 A | 7/1993 | Eigler et al. |
| 5,626,359 A | 5/1997 | Steffens, Jr. et al. |
| 5,790,404 A | * 8/1998 | Faye et al. .................. 280/735 |

FOREIGN PATENT DOCUMENTS

| DE | 196 16 836 A1 | 11/1997 |
| DE | 197 24 101 A1 | 12/1998 |
| DE | 198 48 997 A1 | 4/1999 |
| WO | PCT/US98/10943 | 12/1998 |
| WO | PCT/US98/22421 | 4/1999 |

* cited by examiner

*Primary Examiner*—Thomas G. Black
*Assistant Examiner*—Tuan C To
(74) *Attorney, Agent, or Firm*—Laurence A. Greenberg; Werner H. Stemer; Ralph E. Locher

(57) ABSTRACT

A triggering algorithm contains an accident classification section. The accident classification section senses the type of an accident that occurs. The accident classification section forms probability values for the types of accident in question when an accident cannot be classified unambiguously. By reference to the type of accident or the probabilities that are determined, weighting factors are formed and are taken into account in the calculation of the criterion and/or of one or more comparison thresholds. The triggering algorithm is modular and can thus be easily standardized on a module-specific basis.

4 Claims, 4 Drawing Sheets

FIG 3
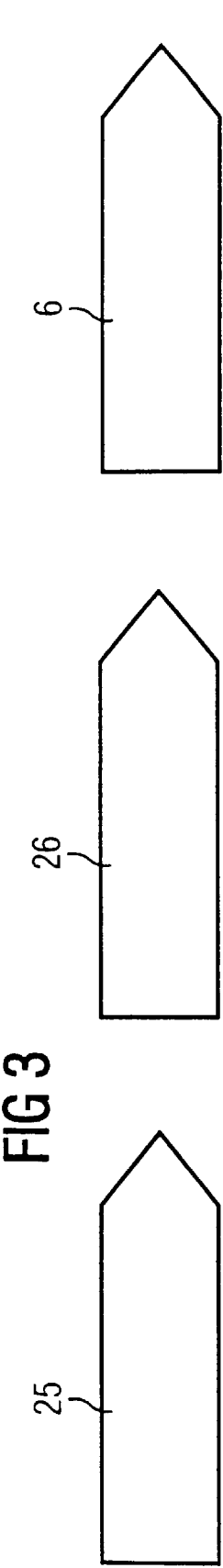
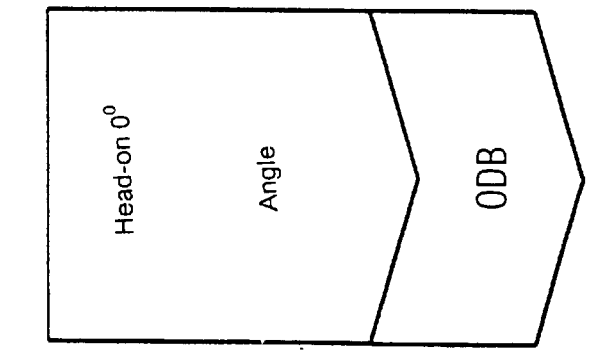

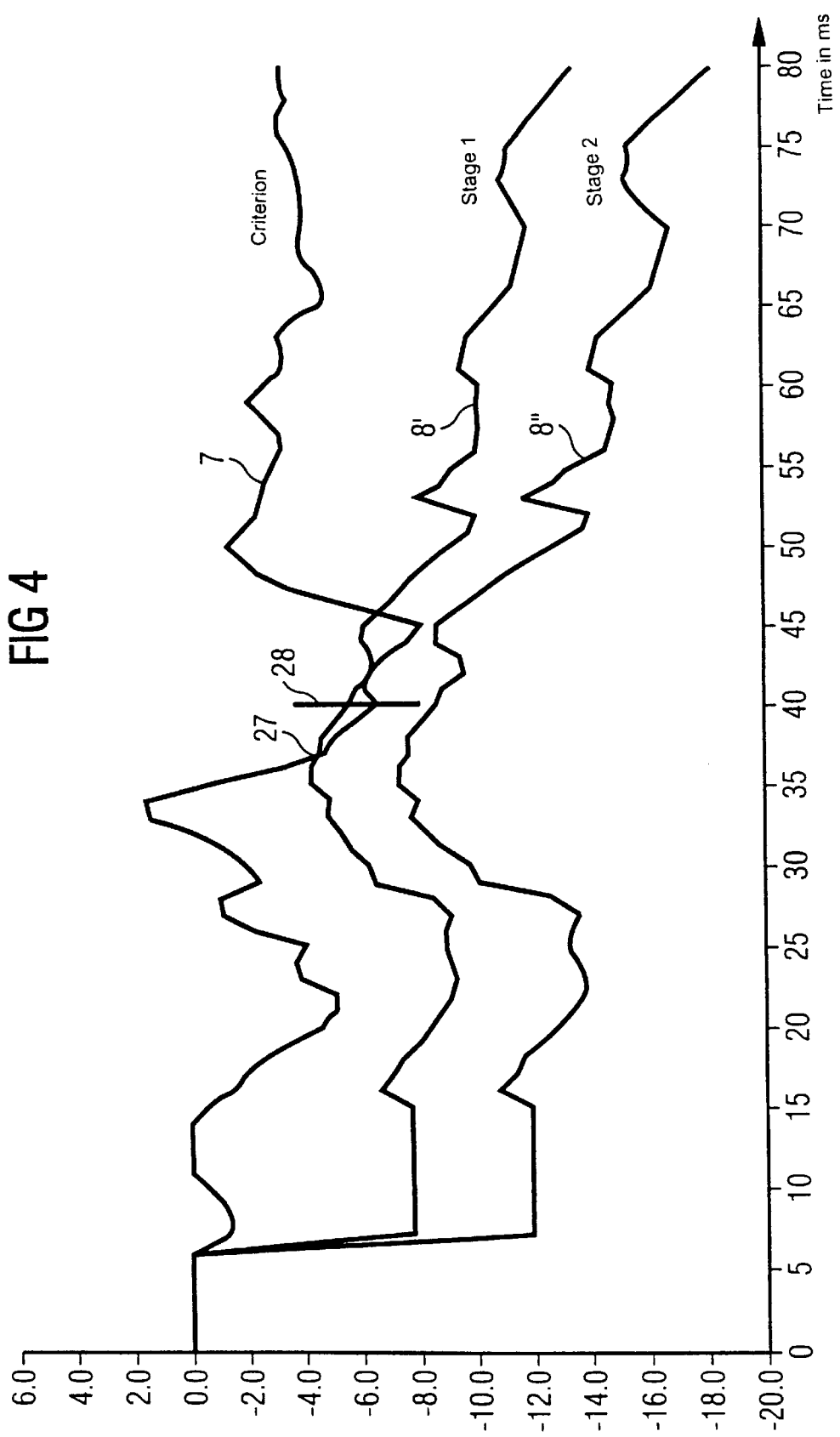

METHOD AND DEVICE FOR CONTROLLING THE TRIGGERING OF A MOTOR VEHICLE OCCUPANT PROTECTION SYSTEM

CROSS-REFERENCE TO RELATED APPLICATION

This application is a continuation of copending International Application No. PCT/DE00/00606, filed Mar. 1, 2000, which designated the United States.

BACKGROUND OF THE INVENTION

Field of the Invention

The invention relates to a method for controlling the triggering of a motor vehicle occupant protection system and a vehicle occupant protection system that is adapted thereto.

Prior-art motor vehicle occupant protection systems are provided with one or more impact sensors whose output signals are evaluated in order to detect an accident, which is critical in terms of safety. Owing to the large number of possible types of accident, the reliable evaluation of the acceleration signals requires a large expenditure. This expenditure is increased even further if vehicle occupant protection components, which fire in multiple stages, for example a multi-stage airbag (with two or more firing caps that are to be fired in succession as a function of the severity of the accident) are to be actuated in a correctly timed way. This also gives rise to stringent hardware requirements in terms of the computing power of the microcontroller or microprocessor used, and these hardware requirements can usually not be met with for an acceptable expense.

In addition, it is difficult to ensure the necessary rapid firing times of the passive restraining systems, i.e. to complete the evaluation calculations within a very short time interval. In addition, in order to improve the vehicle occupant protection system both from the point of view of legislation and also from the point of view of vehicle manufacturers, new test situations for head-on impacts are being defined that require a passive restraining system to be triggered. Currently, customary test situations for head-on impacts are a head-on impact against a rigid wall, an impact against a rigid obstacle with partial covering (offset test), or at an acute angle (angle test), as well as an impact against a deformable obstacle with partial coverage, i.e. an ODB (offset deformable barrier) test.

SUMMARY OF THE INVENTION

It is accordingly an object of the invention to provide a method and device for controlling the triggering of a motor vehicle occupant protection system that overcomes the hereinafore-mentioned disadvantages of the heretofore-known devices of this general type and that provides a method for controlling the triggering of a motor vehicle occupant protection system that is defined by a good vehicle occupant protection function.

With the foregoing and other objects in view, there is provided, in accordance with the invention, a method for controlling the triggering at least one vehicle occupant protection component of a motor vehicle occupant protection system in the event of an impact. The first step of the method is providing at least one accident sensor and a control unit evaluating the output signals of the accident sensor. The next step is classifying the impact type by the output signal of the accident sensor with an impact type classification section. The next step is including in a triggering algorithm parameters depending on the impact type. The next step is firing the vehicle occupant protection components according to a triggering algorithm.

With the objects of the invention in view, there is also provided a motor vehicle occupant protection system. The motor vehicle occupant protection system includes an accident sensor outputting an output signal and a control unit. The control unit connects to the accident sensor and senses an impact in accordance with a triggering algorithm. The control unit also triggers at least one vehicle occupant protection component in the event of an impact. The triggering algorithm has an accident classification section that determines the type of impact from the output signal. The triggering algorithm is adapted as a function of the determined type of impact.

In accordance with a mode of the invention, in the event of an accident, in addition the type of accident, for example head-on impact against a rigid wall or oblique impact or impact against a deformable obstacle, is sensed. Taking the type of accident into account allows for the signals, which are formed internally for the triggering decision, to be additionally defined as a function of the type of accident, and therefore for a triggering control that is better adapted to the respective accident event to be obtained.

The triggering algorithm is thus adapted as a function of the type of accident detected. This can be accomplished in different ways. It is possible to provide in the control unit different triggering algorithms that are optimized for the individual types of impact. As a function of the type of the impact that is detected, the triggering algorithm that is provided for that type is then called and processed. These triggering algorithms may have a structure that is known per se, for example for the "head-on impact against a rigid obstacle" type, in which there is very strong acceleration, the acceleration signal or a variable defined therefrom can simply be compared with a high threshold value. In the case of the "head-on impact against a deformable obstacle" impact type, the acceleration signal or a variable defined therefrom can be compared with a lower threshold, and in addition the period for which the acceleration signal exceeds a specific value can also be taken into account.

However, in a preferred embodiment, just one single triggering algorithm is provided. The algorithm is stored in the control unit and its parameters, for example, the level of threshold values, being modified as a function of the type of impact detected. This reduces the requirement of memory space and makes it possible to start processing the triggering algorithm immediately when the start of an impact is detected, even if the detection of the type of impact has not yet been completed.

In a preferred embodiment, the acceleration signal is output by the central acceleration sensor. The central acceleration sensor is generally mounted in the central control unit. The central control unit is normally disposed at the front in the tunnel region. The acceleration signal is utilized and evaluated in two ways, namely on the one hand to detect the type of accident and on the other hand as the acceleration signal that is to be evaluated by the triggering algorithm. Thus, there is no need for an additional, exported sensor. However, if one or more additional exported sensors should be present, their output signal can additionally (or exclusively) be evaluated in order to detect the type of accident and/or during the processing of the triggering algorithm.

If it is not possible to draw unambiguous conclusions about a specific type of accident from the sensor signal profiles, a membership value, in particular, a probability value, which reflects the probability that an accident is of a specific type of accident, is preferably formed. With such an ambiguous assignment, a plurality of probability values may also be obtained, for example 80% for "head-on impact (0°) against a rigid obstacle" and 20% for "angular head-on impact against a rigid obstacle". Such "fuzzy" values can be used for "fuzzy" influencing of the triggering algorithm, for example for forming weighting factors for evaluating individual variables which are formed and/or evaluated during the processing of the triggering algorithm. The weighting factors, for example, can be set as a function of the probability values to intermediate values between the weighting factors predefined for the individual types of accident.

The invention also can be used advantageously for firing vehicle occupant protection systems, which can be fired in a two-stage or multi-stage fashion, for example two-stage airbags. The type of accident which is detected or the membership value or values determined can then be processed not only in the triggering algorithm section provided for the first firing stage but also in the triggering algorithm section for the second stage, ensuring dual utilization of the sensed type of accident and reliable control of the triggering with acceptable computational outlay and in a sufficiently short time.

The triggering algorithm is advantageously of modular construction: one module performing the detection of the type of accident, while a further module forms comparison values for the comparison with the current acceleration or a variable that is dependent thereon, and a third module carries out the comparison between these variables. This permits already tested triggering algorithms to be used in the second and third modules, which are only additionally influenced by the first module. At the same time, simple and separate parameterization of the modules in adaptation to different types of vehicle, platforms and the like can be completed.

The invention permits not only rough classification of general types of accident such as head-on impact, side collision or rear impact, but is also defined in particular by the possibility of also performing fine classification within the type of accident, namely for example in the case of the "head-on impact" type to make a finer distinction between "head-on impact (angle 0°) against a rigid obstacle", "head-on impact against a soft obstacle (if appropriate with partial coverage)", "head-on impact with partial coverage against a rigid obstacle" or "angular impact", and if appropriate the probability of the present impact belonging to the subclasses in question.

The triggering algorithm that is influenced as a function of the type of accident can either be a simple algorithm, in which the acceleration which is currently sensed and is possibly subjected to preprocessing is compared with a threshold value, or can also be a mature algorithm in which variables derived from the acceleration sensor signals are determined and terms are formed which represent specific characteristics such as for example the prediction of the displacement of the head or the like, and are used in defining the variables, for example the threshold values, which are taken into account for the triggering comparison.

Other features that are considered as characteristic for the invention are set forth in the appended claims.

Although the invention is illustrated and described herein as embodied in a method and device for controlling the triggering of a motor vehicle occupant protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic view of the way in which weighting factors of the triggering algorithm are influenced; and FIG. 4 is a graph plotting the profiles of a signal, which is dependent on the acceleration, and of thresholds, which are formed for the firing decision, versus time.

DESCRIPTION OF THE PREFERRED EMBODIMENTS

Figure 1:
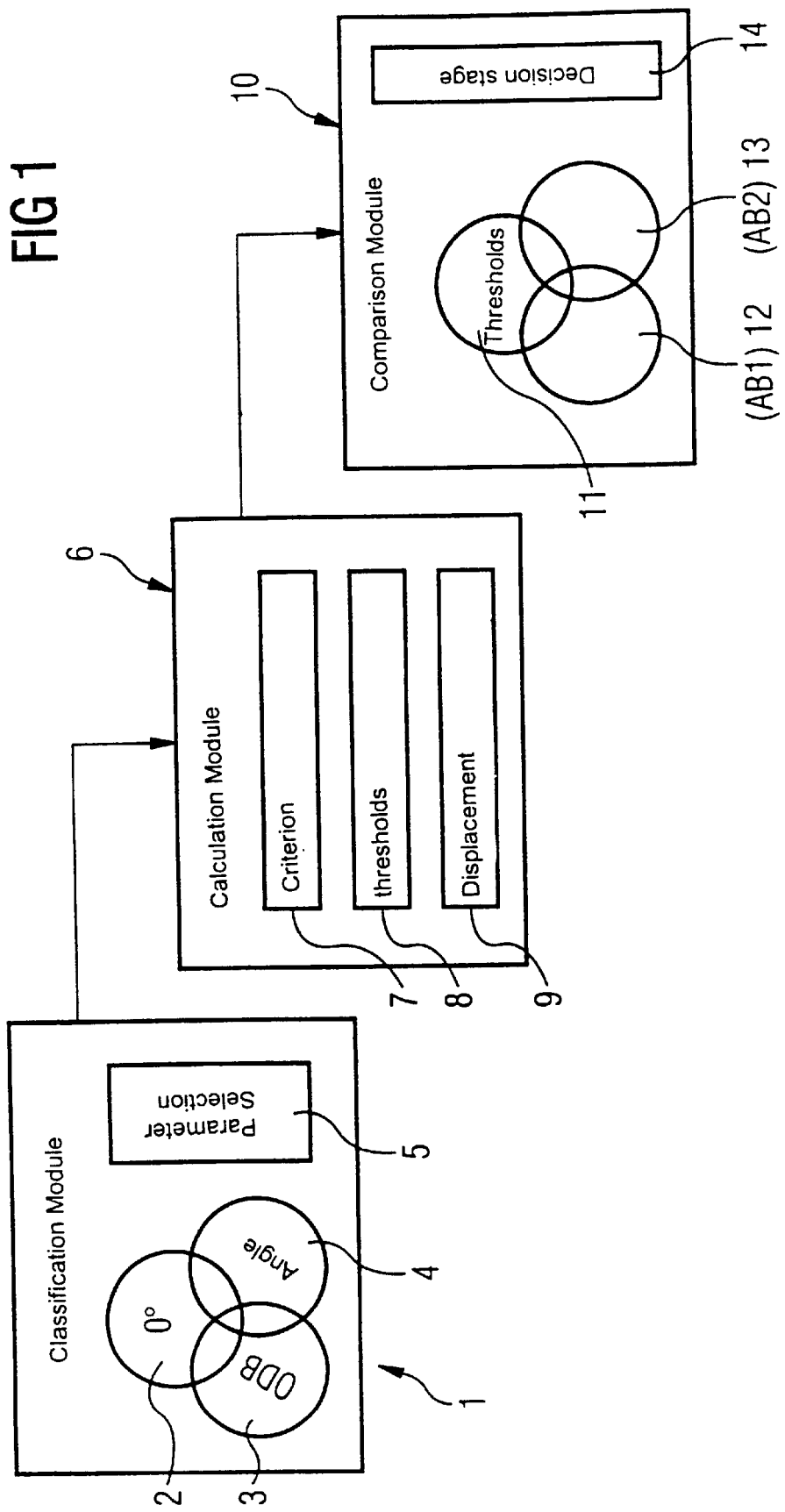
FIG. 1 is a block circuit diagram of a modular triggering algorithm.

In all the figures of the drawing, sub-features and integral parts that correspond to one another bear the same reference symbol in each case.

Referring now to the figures of the drawings in detail and first, particularly to FIG. 1 thereof, there is shown a vehicle occupant protection system and the central control unit that processes the triggering algorithm are not illustrated in the drawings. These components may be of conventional construction. The triggering algorithm according to the invention is preferably of modular construction and includes a classification module 1, a calculation module 6, and a comparison module 10. The classification module 1 is configured here for a fine classification of the type of accident in the event of a head-on impact, namely for distinguishing between a head-on impact against a rigid wall with full coverage, a head-on impact against a rigid wall with partial coverage, an angular head-on impact against a rigid wall, and a head-on impact with partial coverage against a deformable obstacle. Such fine classification can also be provided for other types of impact, for example a side collision. Each of these different types of impact produces a characteristic profile of the acceleration measured. A head-on impact against a rigid wall at a low speed during which triggering is not justified leads, for example, to a higher acceleration amplitude than an impact against a deformable barrier (ODB) at a high speed during which triggering is appropriate. The mechanical properties of the respective motor vehicle platform also have much influence on the acceleration signal measured in the central control unit, but can be compensated for a respective type of motor vehicle by appropriate adjustment of parameters.

Figure 2:
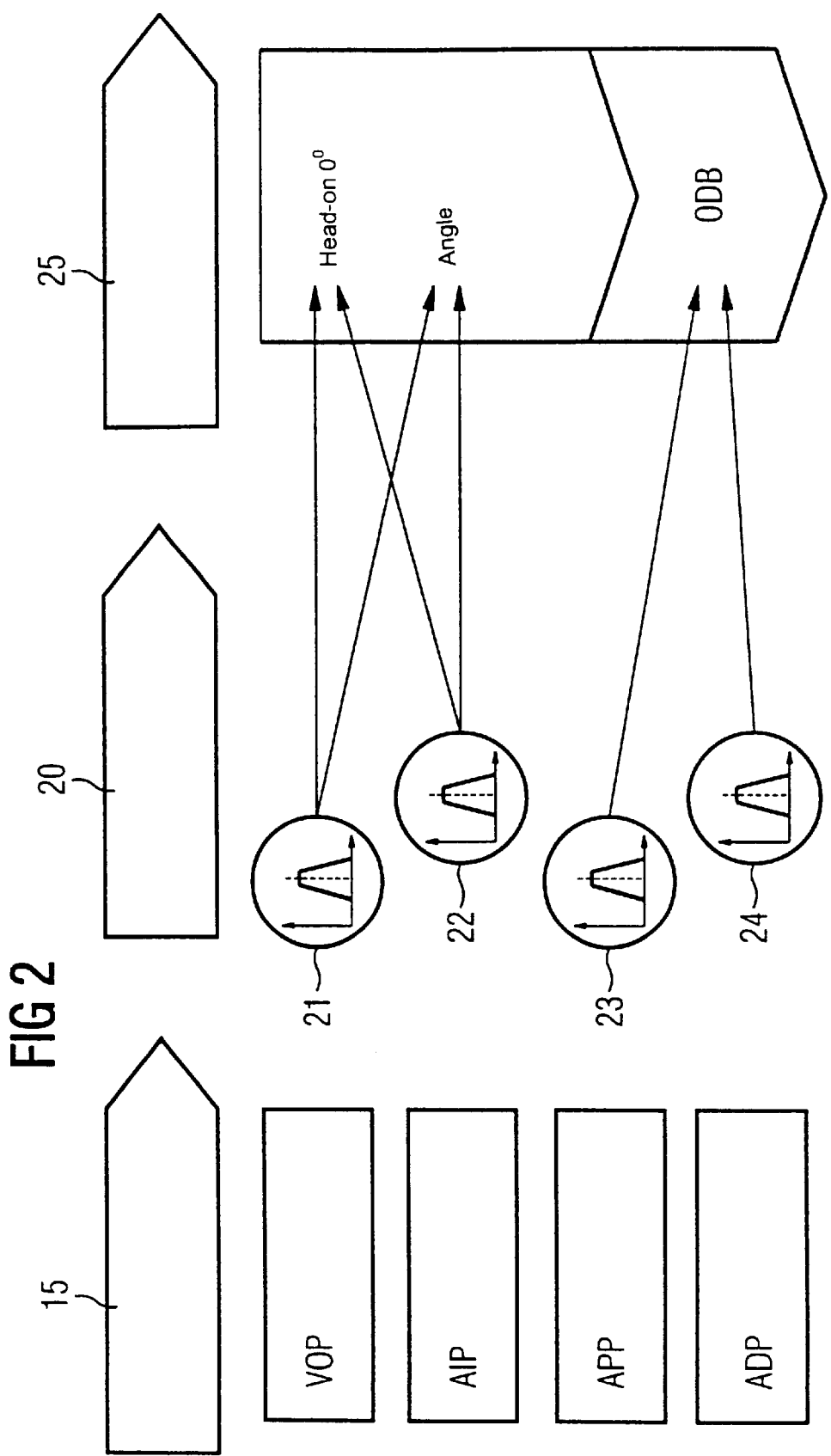
FIG. 2 is a diagrammatic view showing details of the detection of the type of accident.

In the classification module 1, features are formed in the longitudinal direction and, if appropriate, also in the lateral direction from the existing acceleration sensors, generally the acceleration sensors generated in the central control unit, in accordance with defined computational rules, which will be explained in more detail with reference to FIG. 2. If additional sensors, for example early detection sensors for accidents, happen to be present in the front region of the motor vehicle, their output signals can also be evaluated to acquire features. By reference to the features acquired, it is possible with a preferably parameterizable combination of the same, to obtain a classification of the current head-on impact situation, namely a distinction between a head-on impact 2 (angle 0°) and a rigid wall, an impact 4 at a specific angle (angle), or an impact 3 against a deformable barrier (ODB). Where an accident cannot be classified unambiguously, the classification module 1 preferably does not make any fixed "yes/no" decision with respect to the individual types of accident but instead calculates probability values or membership values for the different classifiable types of accident. This is symbolized in FIG. 1 by the distinction between the accidents types 2, 3 and 4.

The calculation module 6 calculates, from the acceleration measured in the central control unit, a value that is designated below as criterion 7 and is used in the comparison module 10 with one or more thresholds 8 which are variable over time, i.e. dynamic, and are also calculated in the calculation module 6. The dynamic threshold/thresholds 8 can be calculated with a prior-art triggering algorithm. It is possible to account for the type of accident sensed as an additional influencing variable. Likewise, the criterion can be calculated, for example, by low-pass filtering and if appropriate sliding averaging of the measured acceleration, the parameters which are necessary in the calculation being adjustable during the standardization of the algorithm as a function of the properties of the type of vehicle. In the calculation of the criterion 7 or of the threshold/thresholds 8 it is also possible additionally to take into account weighting factors which are standardized as a function of the impact situation which is detected by the classification module 1. Scaling is possible here separately for each impact situation and each weighting factor. In addition to the calculation of the criterion 7 and of the dynamic threshold/thresholds 8, the displacement 9, caused by the impact, of the driver's head or of a passenger's head that is to be expected after the airbag inflation times respectively passed can also be calculated in the calculation module 6.

In the comparison module 10, the criterion 7 is compared with the dynamic threshold/thresholds 8 and in a decision stage 14 it is decided whether a seatbelt pretensioning system 11, the first stage 12 of an airbag which can be fired in two stages and/or the second stage 13 of this airbag is/are to be fired.

FIG. 4 shows an example of the variation over time of the criterion 7 and of the dynamic thresholds 8', 8" in the event of a head-on impact. If a vehicle occupant protection component that can only be fired in one stage is to be controlled, only one threshold 8' is calculated. As is clear from FIG. 4, the thresholds 8', 8" change dynamically as a function of the acceleration profile. At a point 27, the criterion 7 drops below the threshold 8'. At a point 28, the firing of the first stage of the vehicle occupant protection component then takes place. The second stage is not fired in the example shown because the value does not drop below the threshold 8".

Generally, the triggering decision for firing the second stage of the gas generator of the vehicle occupant protection component can be made in different ways. In one possibility, as shown in FIG. 4, the criterion 7 is compared with the dynamic threshold 8", which is determined in a way analogous to the threshold 8' calculated in order to trigger the first stage, in which case however the dynamic threshold 8" is calculated with parameters which are standardized especially for this reason. With logical links, it is ensured here that the second stage can be activated only after the first stage has been triggered, if appropriate only after an adjustable delay time, which can be adjusted as a function of the generator architecture used. Alternatively, it is possible to predefine a separate algorithm for the firing of the second stage, which algorithm is optimized exclusively for analyzing the severity of the accident. It is possible that the calculation of this algorithm is not started, for example, until the first stage is fired, in which case the classification results of the classification module 1 are incorporated into this algorithm, and thus into the calculation of the threshold 8" for the triggering of the second stage. Alternately, the calculation of the separate algorithm for the second stage can also be started before the firing of the first stage should information which is present only at this time be necessary for this algorithm.

The method of operation of the classification module 1 will be explained in more detail below with reference to FIGS. 1, 2, and 3. As is shown in FIG. 1, the classification module 1 can distinguish between the impact types 2, 3, and 4 and at a step 5 it performs the evaluation or setting of parameters such as for example weighting factors, which are used in the calculation module 6. In the classification module 1, accident-characterizing features 16 to 19 are firstly determined in a first calculation step 15 in accordance with FIG. 2, said features 16 to 19 including the integrated, measured acceleration, i.e. the actual change in speed minus an offset value (feature 16); an angular integration (feature 17) in which a sensed angular acceleration is integrated once or twice, in order to sense an angular change of the motor vehicle with respect to the longitudinal direction; the checking of the presence of a plateau-shaped profile in the acceleration signal (feature 18) which may be characteristic for an impact against a deformable obstacle; and/or checking of the dynamic changes in the acceleration signal (feature 19). It is not necessary for all the features 16 to 19 to be respectively checked in parallel in the first calculation section 15. However, it is also possible, if appropriate, to check and evaluate further characteristic features.

In the second calculation section 20, the values (values of the features 16 to 19) that are determined in the first calculation section 15 are weighted with respect to their current value with the weighting curves shown schematically in FIGS. 21 to 24, in which curves there is in each case an assignment to the determined value of the associated feature on the horizontal axis, and the output value which can vary for example between 0 and 1 is illustrated on the vertical axis. The value, which is especially characteristic of a particular type of accident, is illustrated in each case with a broken line in reference numbers 21 to 24. If the feature has this value or a value which differs only slightly from it, the maximum output value, for example "1", is output. If the value of the feature lies far outside, it is output as output value "0". The weighting is distinguished here by oblique transitions so that feature variable values, which again still clearly lie far outside at the central value are to be weighted with intermediate values as output values which can vary between the maximum value and the minimum value, for example "1" and "0", and can have, for example, the value 0.9, 0.7, 0.1 or an intermediate value depending on the distance from the central value. In the second calculation section 20, the output values which are obtained during the weighting of the curves 21 to 24 are then combined in the way illustrated in order to determine the type of accident, or in order to determine the probability for a respective type of accident in the case of a type of accident which cannot be classified unambiguously. If, for example, the output value which is obtained by the weighting curve 21, does not significantly signal a head-on impact, but has a value which lies considerably above 0, and the output value which is obtained by the weighting curve 22 does not clearly signal an angular impact either but rather has a value lying between the minimum and maximum values, the probability that the impact can be a head-on impact or an angular impact against a rigid obstacle are obtained by offsetting the two output values. Likewise, with the output values obtained with evaluation curves 23 and 24, it is determined whether and with what probability the impact is an ODB crash.

In the third calculation section 25, the respective membership values, i.e. the probability values, for the individual types of impact 2, 3, and 4 are defined, or, when already completely formed in the second calculation section 20, output as output variables. For example, the result that is output can be "70% probability of head-on impact 0°" and "30% probability of angular impact".

FIG. 3 illustrates the transition region between the classification module 1 and the calculation module 6; the calculation section 25 is illustrated once more in FIG. 3. The third calculation section 25 is adjoined by a fourth calculation section 26 of the classification module 1 in which the value of weighting factors is defined as a function of the type of accident detected or the probability values. In the table illustrated in the calculation section 26, individual parameters are listed which are used to calculate internal values by reference to which a threshold, for example a threshold 8', is then defined by combination. In the table shown, the following parameters are then listed in the individual columns from left to right: "constant part" (for example threshold value at whose upward transgression firing is always to occur), averaged acceleration, dynamic term (characterizes the dynamic profile of the acceleration), and "energy". Other or further parameters can also be provided. The numerical values, which are preset for the individual parameters, are given in the first row of numbers. The row below that is provided for the "pure head-on impact 0% against rigid impact" type detection and indicates by what percent the preset values are to be changed. Because the preset values for a head-on impact are optimized in the example shown, in this case, no reduction takes place so that the weighting factors for the reduction are each 0.00. In the line below that, the weighting factors for the detected pure ODB crash are provided, in which crash, for example, the constant part, i.e. the maximum threshold, is reduced by 50% (−0.50) i.e. lowered to 3,750. This allows for the fact that in the event of an impact against a soft obstacle the maximum acceleration, which occurs is significantly lower than in the event of a head-on impact against a rigid obstacle.

In the lowest line of the table of the calculation section 26, the weighting factors for a detected pure angular impact are illustrated. In this case, for example, the constant part is reduced by 35% (−0.35). If no one-hundred-percent assignment to a specific type of accident has been determined during the crash detection but rather only a 70% probability of a head-on impact against a rigid obstacle and a 30% probability of an angular impact has been obtained, as in the previous example, the weighting factors which are respectively provided for these types of accident are calculated in the appropriate ratio and an intermediate value for the weighting factor is formed. In this example, the following is obtained as the new weighting factor:

(70%·0.00+0%·−0.5+30%·−0.35=−0.105).

The constant part is therefore reduced by 10.5% with respect to the preset part of 7,500. A weighting factor is also correspondingly formed for the further parameters and lies, averaged in accordance with the probability ratio, between the weighting factors respectively given in the table. In the case of other probability ratios for the individual types of accident, the weighting factors are modified in a way analogous to the example given above in accordance with the probability ratio which is then obtained. As a result, to a certain extent, there is "fuzzy" processing because it is possible to operate not only with fixed logic values "0" and "1" but also with continuously variable intermediate values if appropriate.

The classification module 1 thus applies, as a result of the accident analysis, the degree of probability that the current accident is a member of a corresponding type of impact and/or sets the corresponding weighting factors depending on whether the latter function is already carried out in the classification module 1 or already in the calculation module 6. Thus, there is no hard classification of an impact as one of the possible types of impact but instead the probability of the impact being a type or types of impact is indicated because overlaps are possible (one ODB test exhibits, for example, an analogy with the angular impact). In the classification module 1, corresponding program calculation steps are carried out in order to form the features 16 to 19 explained by reference to the first calculation section 15, and if appropriate further features are executed which are then, as explained, combined and "fuzzified", i.e. logically connected to probability values.

Because different motor vehicle platforms exhibit certain similarities in terms of the curve shape of the acceleration profile during the given impact trials, a basic standardization can be provided, which, depending on the current platform type, then has to be adapted only slightly and partially, for example by changing the preset values shown in FIG. 3 and/or weighting factors of the individual types of impact.

The results of the impact classification by the classification module 1 can be applied jointly in all the further modules 6, 10 and if appropriate further modules as well as in the threshold calculations. For example, the threshold calculations for a vehicle occupant wearing a seatbelt, a vehicle occupant not wearing a seatbelt, and, if appropriate, the decision relating to the severity of the impact that leads to the firing of a further stage are carried out on the basis of the results of the classification module 1. For this module section, which makes the decision about the severity of the impact, there is thus no need for any different parameters for the calculation. The actuation of multi-stage restraints is thus also made easier and the expenditure in terms of calculation and time required for this is reduced. In this way, a correctly timed decision with acceptable hardware requirements is ensured.

The analysis and classification of the type of impact provides a basic general value, which is then used as a basis for the further calculations for the "firing/not firing" decision as well as for the analysis for the severity of the impact.

Here, the information from possibly additional accident sensors mounted on the motor vehicle, for example "early crash" sensors in the front region, can easily be integrated into the existing system. The triggering decision can be made here either as a function of the information, which originates from such additional sensors and is possibly subjected to integrated signal preprocessing or by reference to parameters, which are specially adapted for the case of an individual central acceleration sensor in the central processing unit and are calculated in the central processing unit. The method of forming the output thresholds, for example the thresholds 8' and 8", on the basis of the respective sensors and their calculation signals can be parameterized easily and flexibly here. This easy parameterization and standardization is also an advantage of the separation into a classification module 1 and a calculation module 6 because these algorithm modules can then each be standardized very largely independently of one another. Here, the number of parameters, which can be set for a respective module, is relatively small and manageable. Because, in addition, there is no feedback or interaction between one module and the other module in the respective setting of the parameters, the parameterization can be carried out very easily and reliably. The modular architecture of the triggering algorithm also permits efficient hardware implementation, which is adapted to the respective application.

We claim:

1. A method for controlling the triggering of at least one vehicle occupant protection component of a motor vehicle occupant protection system in the event of an impact, which comprise:

providing at least one accident sensor and a control unit evaluating output signals of the at least one accident sensor according to a triggering algorithm;

classifying membership probabilities to at least two impact types from the output signals of the at least one accident sensor with an impact type classification section of the triggering algorithm, the membership probabilities having values being a respective impact type variable depending on a precision of classification of the impact;

forming weighting factors as a function of the membership values;

weighting preset values in the triggering algorithm with the weighting factors;

calculating the thresholds with the weighted preset values;

adjusting one of the triggering algorithm and parameters of the triggering algorithm depending on a result of the impact type classification, the parameters including at least one of an acceleration-depending criterion and at least one threshold comparable with the criterion; and comparing the output signals with the at least one adjusted threshold, and firing the at least one vehicle occupant protection component according to a result of the comparison.

2. The method according to claim 1, which further comprises varying the membership values between and including 0% and 100%.

3. The method according to claim 1, which further comprises:

using a central acceleration sensor as the accident sensor;

forming a criterion and at least one threshold in the control unit with output from the central acceleration sensor.

4. The method according to claim 1, which further comprises:

providing an exported sensor connected to the control unit;

evaluating output from the exported sensor with the control unit; and forming a criterion and at least one threshold in the control unit from the output signal from the exported sensor.

* * * * *